United States Patent Office 3,373,134
Patented Mar. 12, 1968

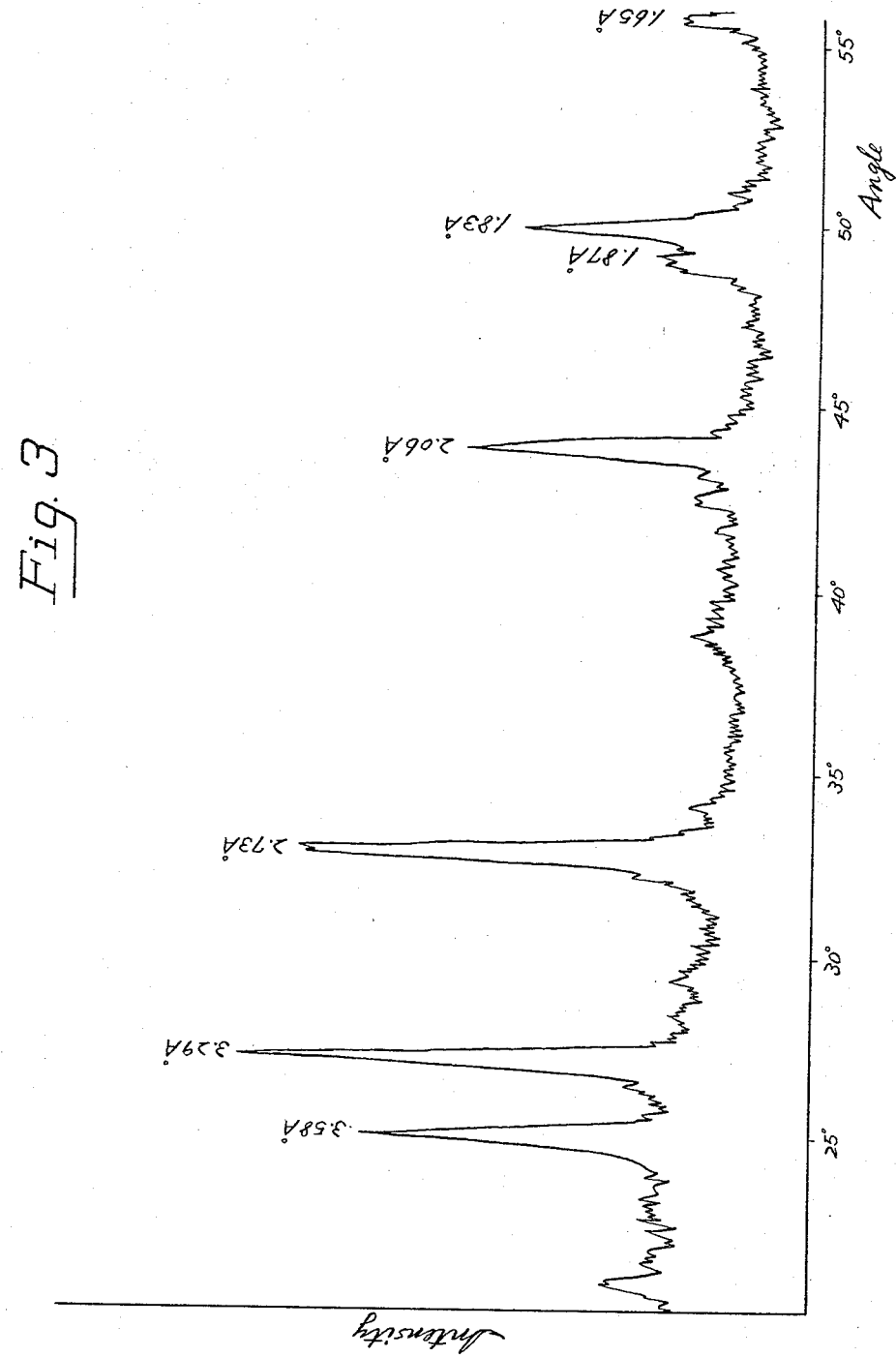

3,373,134
COMPOSITIONS OF CALCIUM CARBONATE, PROCESS FOR THE PRODUCTION AND USES OF THE SAME
Eizo Yasui, Shichiro Shoda, Hiroshi Suzuki, and Hiroshi Yamada, Nagoya-shi, Japan, assignors to Toa Gosei Kagaku Kogyo Kabushiki Kaisha, Tokyo, Japan, a corporation of Japan
Filed Aug. 13, 1964, Ser. No. 389,453
Claims priority, application Japan, Oct. 18, 1963, 38/54,917; May 7, 1964, 39/25,527
6 Claims. (Cl. 260—41.5)

ABSTRACT OF THE DISCLOSURE

Calcium carbonate crystals of the vaterite and aragonite type containing silicic acid for use as a reinforcing filler in a vulcanization composition, and a process for the preparation thereof.

---

Figure 1:
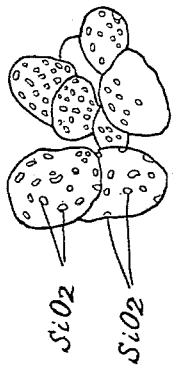

This invention relates to a new finely divided and a light composition of calcium carbonate in which amorphous silicic acid is dispersed within the grains of calcium carbonate, to a process for the production of such compositions and to vulcanizable compositions of synthetic rubber comprising one of said calcium carbonate compositions.

An object of the invention is to provide a new finely divided and light composition of calcium carbonate suitable for use as filler which is demanded in the manufacture of rubber, paper and various plastics. A further object is to develop the uses of the new compositions for the invention.

Calcium carbonate finds wide applications in the manufacture of rubber, paper, plastics, paints, foodstuffs, cosmetics and medicines etc. However, the crystalline structure, distribution of grain size, apparent density, dispersibility and surface activity of the calcium carbonate used should vary depending on the purposes to which it is applied.

The crystalline structure of calcium carbonate includes three types of modifications, namely the calcite type (hexagonal system) which is seen in the calcite and egg shell; the aragonite type (rhombic system) which is seen in the aragonite and scallop shell; and the vaterite type (pseudohexagonal system) which is found in an unstable intermediate state.

Among them, the calcite type crystalline calcium carbonate is most stable, and the aragonite type crystalline calcium carbonate as well as the vaterite type crystalline calcium carbonate are said to ultimately convert into the calcite type by themselves.

To obtain finely divided calcium carbonate, naturally occurring lime stone is usually ground in a mill. However, the finely divided calcium carbonate obtained in this way is usually of the calcite type and shows non-uniform grain size, an apparent density of at least 0.6 and lower dispersibility, and additionally contains many impurities. Therefore it is unsuitable for use as a filler in the manufacture of rubber, paper, etc., as mentioned above. In addition, finely divided calcium carbonate may also be produced by other synthetic methods, one of which is carried out by blowing gaseous carbon dioxide obtained from the calcination of lime stone into a purified milk of slaked lime. A further method of producing the finely divided calcium carbonate consists of the reaction of calcium chloride with sodium carbonate in an aqueous reaction medium. However, all of the crystalline calcium carbonate obtained by the prior art methods are in the form of coarser crystals of the calcite type. Calcium carbonate containing a large proportion of the aragonite or vaterite type crystals has been said to be very difficult to produce. U.S. Patent No. 805,581 discloses that crystalline calcium carbonate of the aragonite type may be produced by blowing gaseous carbon dioxide and ammonia gas into an aqueous solution of calcium chloride. It has been found, however, that the calcium carbonate product obtained by the method of this patent contains a predominant proportion of the calcite type crystals and less than 50% of the aragonite type. Furthermore, these crystals have a very large grain size and lower dispersibility. The grain size and apparent density of the product cannot be controlled by this method. It is also known that crystalline calcium carbonate of the vaterite type may be formed by decomposing basic calcium carbonate in the presence of certain ions (refer to "Bull. Chem. Soc. Japan" 35, 1937, 1962). It is also known, that calcium carbonate having a large proportion of vaterite type crystals can not be prepared by commercial process because of its instability and would probably need an extremely large amount of energy under special conditions to prepare.

Thus, all of the prior art methods of producing crystalline calcium carbonate are exclusively directed to the production of the calcite type of crystalline calcium carbonate. A process for the commercial production of the vaterite and aragonite type crystalline calcium carbonates has not been developed. From the view-point of the crystalline structure, the vaterite and aragonite type crystalline calcium carbonates appear to have a greater surface-activity than the calcite type and show various advantages in the aforesaid applications if they may be obtained in a pure, stable and finely divided state. It has been found that finely divided and lighter calcium carbonate may be obtained when gaseous carbon dioxide or ammonium carbonate is reacted with calcium chloride in an aqueous solution which is kept alkaline at pH value of 8 or higher by addition of ammonium hydroxide, and in the presence of an amount of colloidal silicic acid. The calcium carbonate product obtained in this way is in the form of composition in which amorphous silicic acid is dispersed within the grains of calcium carbonate.

According to an aspect of the invention, we provide a process for the production of finely divided lighter compositions of calcium carbonate in which amorphous silicic acid is dispersed in the grains of calcium carbonate, characterized in that a carbonation reagent selected from the group consisting of gaseous carbon dioxide and ammonium carbonate is reacted in the presence of colloidal silicic acid with calcium chloride in an aqueous solution which has been made alkaline at a pH value of 8 or higher by addition of ammonium hydroxide, while the pH value of the reaction mixture is maintained at 8 or higher during the reaction by addition of ammonium hydroxide.

In the process of this invention, the resulting product is finely divided and shows a grain size of up to several microns and, if desired, of from 1 micron to several millimicrons. It is not difficult to produce the product of an apparent density of only 0.3 or below by the process of the invention. As to the crystalline structure of calcium carbonate present in the compositions produced by the process of the invention, it is seen that the calcium carbonate may be of the vaterite type crystals or of the aragonite type crystals or of a mixture thereof together with a small proportion of the calcite type crystals. In the compositions the grains of calcium carbonate are fine, lighter in weight and contain amorphous silicic acid dispersed therein, so that they show little tendency to be involved in secondary aggregation. In this respect, the compositions produced by the process of the invention are distinct from a mixture of calcium carbonate grains and fine particles of amorphous silicic acid in which the particles of the silicic acid exist outside the grains of calcium carbonate. In the compositions produced by the process of the invention, the silicic acid is present in the form or amorphous acid and not in the form of crystalline calcium silicate. This can be confirmed from X-ray diffractometry of the compositions which gives diffraction charts of amorphous silicic acid and crystalline calcium carbonate of the aragonite type and/or the vaterite type.

The reason why calcium carbonate present in the compositions is in the form of fine crystals is probably because the colloidal silicic acid uniformly dispersed in the liquid medium constitutes the nucleus for the crystallisation of calcium carbonate. In order to obtain finely divided crystalline calcium carbonate, it is necessary to provide the presence of colloidal silicic acid in the reaction medium wherein calcium carbonate is being formed, in an amount sufficient to insure that the resulting crystals of calcium carbonate may contain at least 2% of silicic acid. With a lower amount of the colloidal silicic acid, the resulting calcium carbonate may be in the form of crystals of the aragonite or vaterite type and in the form of coarser crystals of a size of from several microns to ten microns or more. On the other hand, the presence of an excess of colloidal silicic acid is not preferred, because the crystals resulting from the carbonation reaction can lose the original nature of calcium carbonate itself. It is preferred to provide the presence of colloidal silicic acid in said reaction medium in an amount up to about 200% by weight of calcium carbonate formed.

The colloidal silicic acid used in the process of the invention may be prepared from the decomposition of a water-soluble silicate such as sodium silicate with acid. We have further found that, in the process of the invention, the presence of colloidal silicic acid also may be provided in situ in the reaction medium by decomposing an aqueous solution of a water-soluble silicate with an aqueous alkaline solution of calcium chloride containing ammonium hydroxide or with an aqueous solution of ammonium carbonate. When the reaction medium containing the colloidal silicic acid prepared in situ is milky, the process of the invention may be carried out without difficulty.

According to an embodiment of the invention, when gaseous carbon dioxide is used as the carbonation reagent, the process may be carried out in such a way that an aqueous solution of a water-soluble silicate is mixed with an alkaline aqueous solution of calcium chloride containing ammonium hydroxide. The resulting reaction mixture containing the colloidal silicic acid is reacted with gaseous carbon dioxide while the reaction mixture is maintained alkaline at a pH value of 8 or higher during the reaction by addition of ammonium hydroxide.

According to a further embodiment of the process of the invention, when ammonium carbonate is used as the carbonation reagent, the process may be carrier out in such a way that an aqueous solution of a water-soluble silicate (e.g. sodium silicate) is mixed with an aqueous solution of ammonium carbonate and the resulting reaction mixture containing the colloidal silicic acid is reacted with an aqueous solution of calcium chloride while the reaction mixture is maintained alkaline at a pH value of 8 or higher during the reaction by addition of ammonium hydroxide. In order to obtain finely divided compositions of calcium carbonate, however, it is preferred to employ sodium silicate in which the ratio of $SiO_2/Na_2O$, namely the content of the silicic acid is higher.

In the process of the invention, it is essential that the pH value of the reaction mixture or zone where calcium carbonate is being formed is maintained constantly at 8 or higher and preferably at 8.4 or above during the reaction by addition of ammonium hydroxide. Below a pH value of 8, the resulting crystals contain a predominant proportion of the calcite type crystalline calcium carbonate. In particular, below a pH value of 7, the resulting crystals consist entirely of the calcite type of calcium carbonate. In order to keep the reaction mixture constantly at a pH value of 8 or higher, the reaction mixture may contain a large amount of ammonium hydroxide, alternatively, ammonium hydroxide or gaseous ammonia may be successively or continuously added into the reaction mixture as the carbonation reaction proceeds.

In the process of the invention, both gaseous carbon dioxide and ammonium carbonate are used as the carbonation reagent. In view of the purity of the calcium carbonate formed, it is preferred to use gaseous carbon dioxide, as the use of ammonium carbonate often results in the formation of the calcite type crystalline calcium carbonate unless the reaction conditions are strictly controlled. It is to be noted that an alkali metal carbonate such as sodium carbonate and potassium carbonate cannot be employed as the carbonation reagent in the process of the invention. If an alkali metal carbonate is used as the carbonation reagent, the calcium carbonate formed is then entirely in the form of the calcite type crystals and there is not obtained any finely divided and lighter composition of vaterite and aragonite type crystalline calcium carbonates.

In the process of the invention, the carbon dioxide used as the carbonation reagent may be in the form of a concentrated gas. However, it is preferred to employ the carbon dioxide which has been diluted with an inert gas such as nitrogen, since the formation and growth of crystalline calcium carbonate may be more easily controlled.

In case the process of the invention is carried out using either gaseous carbon dioxide or ammonium carbonate as the carbonation reagent, it is preferred to agitate the reaction mixture vigorously by means of a strong agitator and perform the reaction under such conditions that high mixing takes place in the mixture. Particularly when the carbonation reaction is effected using gaseous carbon dioxide, rapid introduction of the carbon dioxide is likely to result in a zone where the gas and liquid when contacted with each other becomes neutral or acidic, though the nature of the whole reaction mixture is apparently maintained alkaline. For this reason, it is desirable to agitate the mixture carefully.

In the process of the invention, generally when the carbonation reaction is effected at a temperature of 35° C. or above the resulting calcium carbonate is substantially in the form of the aragonite type crystals, and when the carbonation reaction is at a temperature lower than 35° C., the resulting calcium carbonate is substantially in the form of the vaterite type crystals. In order to form a crystalline calcium carbonate in which the proportion of the aragonite type crystals is higher or predominant, it is preferred to carry out the reaction at a temperature of 40° C. or above. In order to form a crystalline calcium carbonate in which the proportion of the vaterite type crystals is higher, it is preferred to bring about the reaction at a temperature of 20° C. or below.

It is acknowledged that there are some methods of the prior art which are similar to but distinct from the process of the invention (refer to German Patent No. 1,156,919). These methods consist of adding an amount of sodium silicate to milk of slaked lime and then blowing gaseous carbon dioxide thereinto to give calcium carbonate containing silicic acid which, if desired, is subsequently added with a quantity of calcium silicate. However, the calcium carbonate product obtained by the methods of the prior art is all composed of the calcite type crystals and shows very large grain size, as shown hereinafter by comparative examples. According to the methods of the prior art, it is impossible to obtain aragonite and vaterite type crystalline calcium carbonate having a high surface activity.

In general, the fine crystals of calcium carbonate of a grain size of up to 1 micron are likely to aggregate into lumps and show a higher apparent density due to their secondary coagulation, unless they art treated in a certain manner. The finely divided compositions of calcium carbonate produced by the process of the invention do not show a tendency to aggregate without such a special treatment. The fine grains of calcium carbonate in the compositions show a decreased degree of coagulation and a better dispersibility, as the amount of the amorphous silicic acid present therein is increased.

X-ray diffractometry of the composition of the invention shows diffraction of both the vaterite type crystalline calcium carbonate and of amorphous silicic acid. Electron microscopic observation shows that it is difficult to distinguish the fact that the crystalline calcium carbonate and the aqueous silicic acid constitute separate individual grains (refer to FIG. 1). From the electron microscopic observation, it is assumed that the individual grains are substantially composed of calcium carbonate and that the amorphous silicic acid is in the form of fine particles dispersed within the grains. However, this assumption is difficult to confirm. Nevertheless, the aforesaid new composition produced by the process of the invention is a uniform composition of the vaterite type crystalline calcium carbonate and amorphous silicic acid and distinguishable from such a mixture or compositions in which the grains of the vaterite type calcium carbonate are so mixed with fine particles of amorphous silicic acid that the latter exist around and outside the former. In the new composition, the grains are present in the form of "spherulite" and contacted with each other in a similar way to the structure of carbon black. We have found that this new uniform composition of the vaterite type crystalline calcium carbonate and amorphous silicic acid is excellent as a white-colored and reinforcing filler for synthetic rubbers.

According to a further aspect of the invention, therefore, we provide a new uniform composition of the amorphous silicic acid containing vaterite type crystalline calcium carbonate of which X-ray diffractometry shows diffraction of both the vaterite type crystalline calcium carbonate and of amorphous silicic acid, and in which electron microscopic observation cannot distinguish that the calcium carbonate and the silicic acid constitute individually separate grains.

It is known that unlike natural rubbers, synthetic rubbers themselves are of lower strength and that only when added with a reinforcing filler so as to relieve the concentration strain do they show improved tensile strength and improved elongation. Hitherto, carbon black is commonly used as black-colored reinforcing filler for synthetic rubbers but it cannot be used for the production of rubber products of white or other color. For the latter purposes, white carbon may be used as the filler. However, when white carbon is incorporated into synthetic rubbers, the tensile strength may be improved but the elongation is decreased and hardness is increased. The upper limit of the quantity of white carbon which may be incorporated is only 80 parts by weight per 100 parts of the rubber. Further, there have been produced various fillers by treating finely divided calcium carbonate with a surface active agent to improve its dispersibility, by activating finely divided calcium carbonate by incorporating therein a substance which may react with the synthetic rubber during the subsequent vulcanization, or by applying colloidal silicic acid or calcium silicate onto the surfaces of finely divided calcium carbonate. However, such fillers substantially consisting of finely divided calcium carbonate are suitable only for imparting improved elongation and hardness to synthetic rubbers and are not effective to improve tensile strength and tear strength of synthetic rubbers. Besides, such fillers are effective only for limited kinds of synthetic rubbers, particularly, steric synthetic rubbers. In order to reinforce synthetic rubbers, it is common to enhance the ability of the synthetic rubbers to be reinforced by blending with natural rubbers or to incorporate both white carbon and finely divided calcium carbonate into synthetic rubbers. However, these procedures do not give entirely satisfactory results. We have now found that the uniform composition of amorphous silicic acid and the vaterite type crystalline calcium carbonate has excellent properties as a reinforcing filler of white color for synthetic rubbers. As stated previously, the amount of amorphous silicic acid present in the uniform composition of the invention may vary from 2% to 200% by weight of the crystalline calcium carbonate. If the amount of silicic acid is less than 2% by weight of calcium carbonate, the grains of the vaterite type crystalline calcium carbonate can be coarser and show a decreased ability to reinforce synthetic rubbers. On the other hand, if the amount of silicic acid is more than 200% by weight, the composition has properties similar to white carbon and loses its filler effect. The reinforcement effect of the composition of the invention for synthetic rubbers is particularly better when the grains of the calcium carbonate present therein have an average grain size not more than 0.1 micron and preferably not more than 0.05 micron. The uniform composition of amorphous silicic acid and the vaterite type calcium carbonate according to the invention, even if not subjected to any special surface treatment, can impart to synthetic rubbers higher tensile strength, higher tear strength, proper modulus elongation, proper hardness and other favourable properties as not attainable by using finely divided crystalline calcium carbonate of the calcite and aragonite types.

With the conventional surface treated and finely divided calcium carbonate filler, the reinforcing effect of this filler usually varies depending on the kind of surface treating agent used, so that there is a tendency for the filler to be effective for only a limited group of rubbers. The uniform composition of amorphous silicic acid and the vaterite type crystalline calcium carbonate of the invention has a reinforcing effect for all kinds of synthetic rubbers, particularly steric synthetic rubbers. In general, as the amount of filler incorporated into rubber is increased, the filled rubber product shows reduced workability, decreased strength and decreased elongation, so that the rubbery nature of the product is considerably impaired. Even when the filler of the present invention is incorporated into synthetic rubbers in large amounts such as 160 parts by weight per 100 parts of the rubbers, and into steric synthetic rubbers in an amount of 100 parts by weight per 100 parts of rubber, the strength of the rubber product is rather likely to increase and the modulus as well as the tear strength increase without considerable loss of the elongation and without extreme increase in hardness. Even if the amount of the filler of the present invention incorporated is greatly increased, the rubbery nature of the product deteriorates only slightly, but the reinforcing effect is enhanced. These favourable characteristics of the filler of the present invention are neither shown by other white colored fillers of similar kinds nor by a mixture which is prepared merely by mixing fine particles of silicic acid with ordinary finely divided calcium carbonate. Although it is not clear why the reinforcing effect of the filler of the present invention is excellent and unique as stated above, it may be assumed that the higher surface activity of the vaterite type crystalline calcium carbonate plays a great part. It is to be noted, however, that the filler of the present invention does not give very favourable results for reinforcing natural rubbers. A reason therefore is probably that the filler of the invention causes a number of breakdowns in the molecules of natural rubbers and promotes the gelation of natural rubbers in the course of the mastication step in a similar way to other reinforcing fillers such as white carbon.

Vulcanization of synthetic rubbers comprising the uniform composition of amorphous silicic acid and the vaterite type crystalline calcium carbonate according to the invention may be carried out in any conventional manner with or without addition of various vulcanization acids or additives. In case it is desired to complete the vulcanization in a shorter period of time, the time of vulcanization required may be properly controlled by adding a proper amount of vulcanization promotor such as, for example, di-ethylene glycol, cyclohexyl amine etc.

The synthetic rubber products so vulcanized show by themselves higher tensile strength, higher modulus and higher tear strength than such synthetic rubber products which have been obtained using any of the commercial reinforcing fillers of white color. They further show a properly improved elongation without greater hardness and show good extending effect and rubbery nature.

With reference to the attached drawings, FIG. 1 shows a diagrammatical view of the grains of calcium carbonate present in the compositions produced by the process of the invention.

Figure 2:
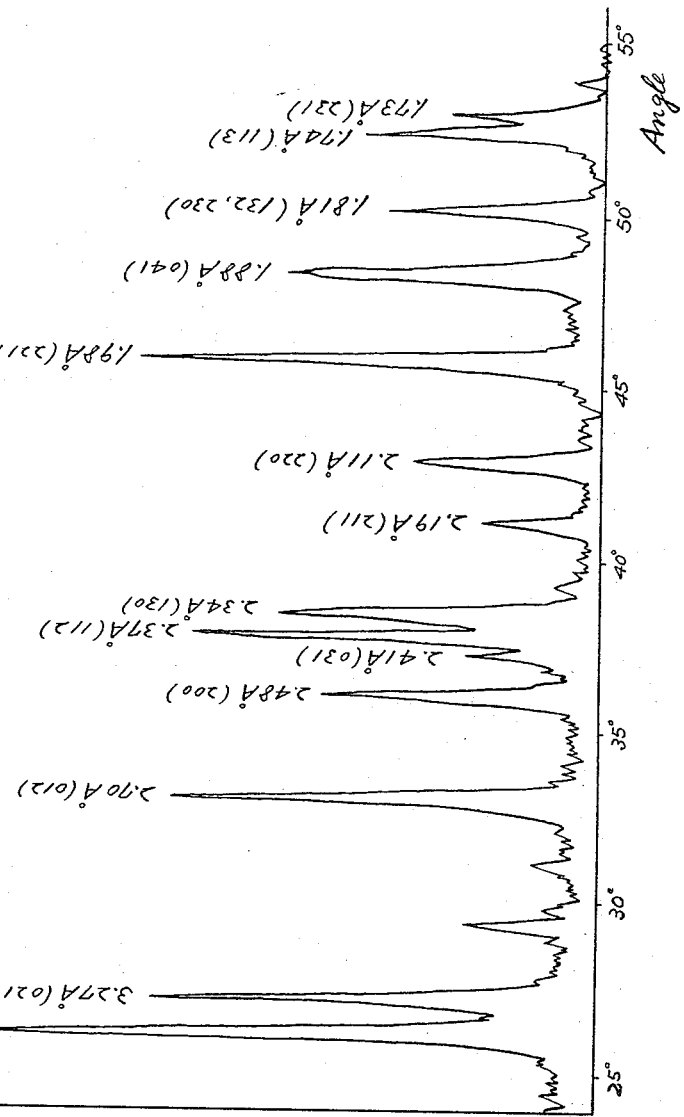

FIGS. 2 and 3 show charts of X-ray diffraction of two samples of the compositions produced by the process of the invention.

The invention is now illustrated with reference to examples and comparative examples which are nonlimitative to the scope of the invention and in which the quantity of ammonium hydroxide used is given in molar per mol. of calcium chloride present, the pressure in kg./cm.$^2$ (absolute), and parts and percent are given by weight.

In these examples, analysis of the crystalline structure of calcium carbonate formed is performed according to the method described in the "Anal. Chem." 20, 886–889, 1948.

*Example 1*

An autoclave of a capacity of 5 l. and provided with an electromagnetic stirrer is charged with 3 l. of an aqueous solution of 10% of calcium chloride which additionally has contained 2 mols. of ammonium hydroxide per mol. of the calcium chloride as well as colloidal silicic acid in an amount of 10% by weight of the calcium chloride. Nitrogen gas is then introduced into the autoclave to a pressure of 5 kg./cm.$^2$. The charge is kept at various temperatures as specified in Table 1 below and agitated at a stirrer speed of 500 revolutions per minute. Carbon dioxide gas is then blown into the charge under the partial pressure of 0.3 kg./cm.$^2$ and under stirring. The carbonation reaction takes place immediately and thereafter is continued until the pH valve of the reaction mixture has reached 8.4. After the reaction is completed, the resulting product deposited is removed from the reactor and washed with water until it is free from the chloride ions. The product is subsequently dried at 100° C. for 3 hours to give a composition of amorphous silicic acid and crystalline calcium carbonate which has such properties as shown in Table 1 below. For comparison, the above procedure is repeated similarly in the absence of colloidal silicic acid. The resulting comparative product has such properties as shown also in Table 1.

TABLE 1

| Reaction condition and properties of product | In the presence of colloidal silicic acid (the invention) | | | In the absence of colloidal silicic acid (comparative) | |
| --- | --- | --- | --- | --- | --- |
| Reaction temperature, in ° C | 40 | 20 | 50 | 40 | 20 |
| Apparent density | 0.46 | 0.48 | 0.50 | 1.00 | 0.85 |
| Crystalline structure | Vaterite | Aragonite | Vaterite | Vaterite | Vaterite |
| Grain size range, in microns | 1–1.5 | 1–0.5 | 2–3 | 10–12 | 3–7 |
| Shape of crystals | Fine columnar * | Spherical | Columnar | Spherical | Spherical |

* X-ray diffraction chart of the fine columnar crystals is shown in FIG. 2 of the attached drawings.
NOTE.—The crystalline structure and grain size range are determined by X-ray diffraction and by electron microscope, respectively.

For the above Table 1, it is seen that the difference between the presence and the absence of colloidal silicic acid in the solution of calcium chloride results in a remarkable difference in the grain size and other properties of the resultant products.

*Example 2*

An electro-magnetically stirred autoclave of a capacity of 3 l. is charged with 2 l. of an aqueous solution of 5% of calcium chloride which has been obtained by double decomposition of slaked lime with ammonium chloride and which has contained 2 mols. of ammonium hydroxide per mol. of the calcium chloride as well as colloidal silicic acid in an amount of 2% by weight of the calcium chloride. Nitrogen gas is introduced into the reactor to a pressure of 3 kg./cm.$^2$, and the charge is then kept at temperatures as specified in Table 2 below and agitated at a stirrer speed of 600 revolutions per minute. Under stirring, carbon dioxide gas is blown into the charge under partial pressure of 0.2 kg./cm.$^2$. The carbonation reaction takes place and is then continued until the pH value of the reaction mixture has reached 8.6. Subsequently the reaction product deposited is removed from the reactor and washed with water until it is free from the chloride ions. The product is then dried at 100° C. for 3 hours to give a composition of amorphous silicic acid and crystalline calcium carbonate which has such properties as shown in Table 2 below. For comparison, the above procedure is repeated similarly in the absence of colloidal silicic acid to give the comparative products of which properties are also shown in Table 2.

TABLE 2

| Reaction condition and properties of product | In the presence of silicic acid (the invention) | | | In the absence of silicic acid (comparative) | | |
| --- | --- | --- | --- | --- | --- | --- |
| Reaction temperature in ° C | 50 | 35 | 18 | 50 | 35 | 18. |
| Apparent density | 0.50 | 0.72 | 0.65 | 0.52 | 0.89 | 0.64. |
| Crystalline structure | Aragonite | Aragonite+Calcite | Vaterite | Aragonite | Vaterite | Vaterite. |
| Grain size range, in microns | 1–2 | 1–0.5 (Ar.) 2–3 (Cal.) | Less than 0.1 | 2–4 | 8–10 | 2–3. |
| Shape of crystals | Columnar | | Spherulite | Columnar | Spherical | Spherical. |

It is also seen that the difference between the presence of colloidal silicic acid and the absence of the same results in a remarkable difference in the crystalline and grain size range of the products obtained.

In the above Examples 1 and 2, the colloidal silicic acid in the aqueous solution of calcium chloride has been provided by reacting the calcium chloride solution containing ammonium hydroxide with an aqueous solution of such a sodium silicate which contains 33% of SiO$_2$ and has a SiO$_2$/Na$_2$O molar ratio of 2.6.

*Example 3*

An electro-magnetically stirred autoclave of a capacity of 30 l. is charged with 15 l. of an aqueous solution of 7% of calcium chloride which has been obtained by double decomposition of slaked lime with ammonium chloride and which has contained 2 mols. of ammonium hydroxide per mol. of the calcium chloride. To the charge are slowly added under stirring 1.21 kg. of such a sodium silicate which has a SiO$_2$ content of 32.6% and a SiO$_2$/Na$_2$O molar ratio of 2.52, so that colloidal silicic acid is deposited and there is formed initially a milky liquid in which a ratio by weight of CaCl$_2$/SiO$_2$ is 2.22. Nitrogen gas is then introduced into the reactor to a pressure of 5 kg./cm.$^2$, and the charge is kept at a temperature of 10° C. and agitated at a stirrer speed of 500 revolutions per minute. Carbon dioxide gas is blown into the charge under stirring and under a partial pressure of 0.2 kg./cm.$^2$. The carbonation reaction takes place and is continued until the pH value of the reaction mixture has reached 8.2. After the reaction is completed the reaction product deposited is removed from the reactor and washed with distilled water until it is free from the chloride ions. The product is subsequently dried at 105° C. for 20 hours in a dried and then ground to give very much finely divided white powder of an apparent density of 0.35 g./cc. in a yield of 92%. X-ray diffraction of this product shows that this product consists of amorphous silicic acid and the vaterite type crystalline calcium carbonate, as will be seen from the X-ray diffraction chart of FIG. 3. As stated above, electron microscopic observation shows that it is difficult to distinguish the fact that the amorphous silicic acid and the crystalline calcium carbonate which are present in the product are separate individual grains. It is observed that the amorphous silicic acid is uniformly dispersed within the grains of calcium carbonate of an average grain size of 0.05 micron.

*Example 4*

An electro-magnetically stirred autoclave of a capacity of 30 l. is charged with 15 l. of an aqueous solution of 7% of calcium chloride which has contained 2 mols. of ammonium hydroxide per mol. of the calcium chloride. To the charge are added slowly under stirring 900 grams of sodium silicate of a SiO$_2$/Na$_2$O molar ratio of 2.45 and of a SiO$_2$ content of 40.3%, so that colloidal silicic acid is deposited and there is formed an emulsion in which the CaCl$_2$/SiO$_2$ molar ratio is 3.54. Nitrogen gas is then introduced into the reactor to a pressure of 7 kg./cm.$^2$, and the charge is kept at 14° C. and agitated at a stirrer speed of 500 revolutions per minute. Carbon dioxide gas is subsequently blown into the charge under agitation and under a partial pressure of 0.3 kg./cm.$^2$. The carbonation reaction takes place and is continued until the pH value of the reaction mixture has reached 8.4. The crystalline reaction product deposited is removed from the reactor and washed with water until it is free from the chloride ions. The product is then dried at 110° C. for 18 hours in a through circulation drier and subsequently lightly ground to give 1 kg. of very much finely divided white powder of an apparent density of 0.38 g./cc. Electron microscopic observation and X-ray diffractometry show that the powder is a composition in which the amorphous silicic acid is uniformly dispersed in the grains of the vaterite type crystalline calcium carbonate of a grain size range of 0.5–0.1 micron.

*Example 5*

An electro-magnetically stirred autoclave of a capacity of 5 l. is charged with a milky liquid which consists of a mixture of 3 l. of an aqueous solution of 4.5% of calcium chloride and 375 grams of sodium silicate having a SiO$_2$ content of 32.6% and a SiO$_2$/Na$_2$O molar ratio of 2.5 and in which colloidal silicic acid is present in a CaCl$_2$/SiO$_2$ molar ratio of 1.1. Nitrogen gas is introduced into the reactor to a pressure of 3 kg./cm.$^2$, and the charge is kept at 8° C. and agitated at a stirrer speed of 750 revolutions per minute. Carbon dioxide gas is then blown into the charge under stirring and under a partial pressure of 0.1 kg./cm.$^2$. The carbonation reaction takes place and is continued until the pH value of the reaction mixture has reached 8.4. After the reaction is completed the reaction product deposited is removed from the reactor, filtered on Buchner funnel under suction and dried at 100° C. for 5 hours. There is obtained in a yield of 85% a finely divided and white colored composition of an apparent density of 0.39 g./cc. and of good dispersibility in which the amorphous silicic acid is uniformly dispersed in the grains of the vaterite type crystalline calcium carbonate.

*Example 6*

An aqueous solution of ammonium carbonate is added with sodium silicate having a SiO$_2$/Na$_2$O molar ratio of 2.55 to form a milky liquid in which the SiO$_2$ and CO$_3$ contents are 8 grams and 4.95 grams per litre, respectively. One litre of the milky liquid is placed in a three-neck flask of glass and agitated at a stirrer speed of 180–200 revolutions per minute while being kept at various temperatures as specified in Table 3 below. To this charge are added a mixture of 144 cc. of an aqueous solution of 15% calcium chloride and 4 cc. of 28% aqueous ammonia under stirring and at a rate of 7.5 cc. per minute. The carbonation reaction takes place to form calcium carbonate. The reaction is completed when the pH value of the reaction mixture has reached about 8.5–8.6. The crystalline reaction product deposited is removed from the reactor and washed with water until it is free from the chloride ions. Drying at 100° C. for 3 hours gives a composition of calcium carbonate having such properties as shown in Table 3 below. For comparison, the above process is repeated similarly except that sodium carbonate is used in place of ammonium carbonate. The results are also shown in Table 3.

TABLE 3

| Reaction condition and nature of product | Carbonation reagent used | | | | |
|---|---|---|---|---|---|
| | Ammonium carbonate (the invention) | | | Sodium carbonate (comparative) | |
| Reaction temperature in °C | 5–6 | 17–18 | 29–30 | 5–6 | 17–18. |
| Yield, in percent | 83 | 83 | 95 | 76 | 91. |
| Apparent density in g./cc | 0.567 | 0.541 | 0.732 | 0.561 | 0.676. |
| Crystalline structure | 60% Vaterite plus 40% Calcite. | 50% Vaterite plus 50% Calcite. | | Calcite | Calcite. |
| Grain size range, in microns | 0.3–1.0 | 0.3–1.0 | 3–4 | 3–5 | 8–10. |

The crystalline structure and grain size range are determined by X-ray diffractometry and electron microscope, respectively.

From the above test, it is seen that only the use of ammonium carbonate as the carbonation reagent results in the formation of the vaterite type crystalline calcium carbonate but the use of sodium carbonate leads to the formation of the calcite type crystalline calcium carbonate.

*Comparative Example 1*

2 l. of distilled water are admixed with various amounts of sodium silicate having a SiO$_2$ content of 27% and a SiO$_2$/Na$_2$O molar ratio of 3.1 as specified in Table 4 below. The admixture is then added with a milk of slaked lime which has been prepared by mixing 89 grams of commercial slaked lime with 400 ml. of water thoroughly. The resulting liquid mixture is placed in a vessel and the vessel is further placed in a tank which is maintained at about 18° C. While the liquid mixture is kept at temperatures as specified in Table 4 below, a gaseous mixture of 830 ml./min. of carbon dioxide and 334 ml./min. of air is blown thereinto under agitation. As the carbonation reaction proceeds, the temperature of the reaction mixture is raised to 21° C.–22° C. After the reaction is completed the reaction product deposited is filtered off by Buchner funnel, washed with water thoroughly and then dried at 100° C. for 3 hours to give such a crystalline product having good dispersibility and a uniform grain size as shown in Table 4. However, the crystal of this product is relatively coarser and its crystalline structure is entirely of the calcite type.

TABLE 4

| Reaction condition and nature of product | 1st run | 2nd run | 3rd run |
|---|---|---|---|
| Amount of sodium silicate added, in grams | 48 | 48 | 120. |
| Reaction temperature in ° C | 19–20 | 21 | 21–22. |
| Reaction time in minutes | 70 | 120 | 180. |
| Apparent density | 0.54 | 0.54 | 0.43. |
| Crystalline structure (X-ray diffractometry) | Calcite | Calcite | Calcite. |
| Grain size range, in microns (electron microscope determination) | 1–2 | 3–4 in rod-shaped. | 5–7 in rod-shaped. |

In the following examples, various fillers are tested for their reinforcing effects for synthetic rubbers. The compositions and natures of the fillers tested are tabulated in Table 5 below.

charge under agitation until the pH value of the reaction mixture has reached 8.6. The reaction product deposited is removed, washed thoroughly with water and dried at 150° C. in a through circulation drier.

*Sample No. 2.*—A 30 l. autoclave is charged with 1.53 kg. of the above mentioned sodium silicate, with 9 l. of water and with 5.97 l. of the above mentioned calcium chloride solution. The subsequent treatment is carried out in the same manner as in the above.

*Sample No. 3.*—A 30 l. autoclave is charged with 1.93 kg. of the above mentioned sodium silicate, with 11.3 l. of water and with 3.75 l. of the above mentioned calcium

TABLE 5

| Fillers tested | Apparent density (g./cc.) | pH | Average grain size, in microns | Composition and characteristics | Electron microphotograph (×100,000) |
|---|---|---|---|---|---|
| Sample No. 1 | 0.38–0.41 | 8.5 | ca. 0.05 | Uniform composition of 1:1 silicic acid/vaterite CaCO$_3$. | Fig. 4. |
| Sample No. 2 | 0.42–0.44 | 8.5 | ca. 0.05 | Uniform composition of 1:2 silicic acid/vaterite CaCO$_3$. | Fig. 5. |
| Sample No. 3 | 0.45–0.46 | 8.5 | <0.1 | Uniform composition of 1:3 silicic acid/vaterite CaCO$_3$. | Fig. 6. |
| Commercial finely divided calcium carbonate (A) | 0.35 | 10.0 | ca. 0.05 | Carbonates containing 32:18 CaO/MgO, surface treated with resinous acid, calcite CaCO$_3$. | Fig. 7. |
| Commercial finely divided calcium carbonate (B) | 0.67 | 8.5 | ca. 0.05 | Calcite CaCO$_3$ surface-treated with ca. 2% of fatty acid. | Fig. 8. |

The above samples Nos. 1, 2 and 3 are produced by the undermentioned ways according to the process of the invention.

*Sample No. 1.*—A 30 l. autoclave is charged with 1 kg. of sodium silicate of a SiO$_2$ content of 46.18% and of a SiO$_2$/Na$_2$O molar ratio of 2.5, with 8.9 l. of water and with 5.94 l. of an aqueous solution of 16.74% calcium chloride which has contained 2.1 mols. of ammonia per mol. of the calcium chloride. Nitrogen gas is introduced into the reactor to a pressure of 5 kg./cm.$^2$, and the charge is kept at a temperature of not higher than 10° C. and agitated. Carbon dioxide gas is then blown into the chloride solution. The subsequent treatment is carried out in the same manner as in the above.

*Example 7*

Various amounts of fillers tabulated in Table 5 are incorporated into a synthetic styrene/butadiene rubber (SBR) by means of 6 x 12″ rolls. The resulting compositions are tested for the extending effect. The test is performed on the test strips which have been prepared by pressing and vulcanizing sheets of mixtures comprising varying quantities of such ingredients as described in Table 6 below, at 145° C. and under a pressure of 150 kg./cm.$^2$ for a given period of time.

TABLE 6

| Ingredients in the mixtures | Sample No. 1 | | | Sample No. 3 | | | Commercial finely divided calcium carbonate (B) | | |
|---|---|---|---|---|---|---|---|---|---|
| SBR No. 1502, in parts by weight | 100 | 100 | 100 | 100 | 100 | 100 | 100 | 100 | 100 |
| Filler in parts by weight | 80 | 120 | 160 | 80 | 120 | 160 | 80 | 120 | 160 |
| Zinc oxide in parts by weight | 5 | 5 | 5 | 5 | 5 | 5 | 5 | 5 | 5 |
| Stearic acid in parts by weight | 3 | 3 | 3 | 3 | 3 | 3 | 3 | 3 | 3 |
| Sulfur in parts by weight | 2 | 2 | 2 | 2 | 2 | 2 | 2 | 2 | 2 |
| Nocceler D in parts by weight | 0.5 | 0.5 | 0.5 | 0.5 | 0.5 | 0.5 | 0.5 | 0.5 | 0.5 |
| Nocceler DM in parts by weight | 1.5 | 1.5 | 1.5 | 1.5 | 1.5 | 1.5 | 1.5 | 1.0 | 1.5 |
| CHA in parts by weight | 0.4 | 0.6 | 0.8 | | | | | | |
| DEG in parts by weight | | | | 0.24 | 0.36 | 0.48 | | | |

TABLE 7

| Properties of the vulcanised compositions | Vulcanization time (min.) | Sample No. 1 | | | Sample No. 3 | | | Commercial finely divided calcium carbonate (B) | | |
|---|---|---|---|---|---|---|---|---|---|---|
| Tensile strength (kg./cm.$^2$) | 20 | 110 | 108 | 110 | 91 | 97 | 102 | 69 | 72 | 69 |
|  | 30 | 109 | 111 | 112 | 93 | 100 | 107 | 59 | 68 | 66 |
| 300% modulus (kg./cm.$^2$) | 20 | 30 | 55 | 73 | 14 | 21 | 58 | 18 | 20 | 45 |
|  | 30 | 37 | 59 | 81 | 20 | 23 | 64 | 21 | 21 | 45 |
| Elongation (percent) | 20 | 720 | 670 | 510 | 850 | 800 | 600 | 590 | 590 | 570 |
|  | 30 | 640 | 520 | 450 | 700 | 750 | 580 | 540 | 570 | 570 |
| Tear strength (kg./cm.) | 20 | 31 | 34 | 37 | 25 | 33 | 37 | 21 | 21 | 21 |
|  | 30 | 30 | 35 | 39 | 23 | 34 | 38 | 21 | 20 | 22 |
| Hardness (JIO) | 20 | 53 | 63 | 76 | 51 | 53 | 74 | 57 | 58 | 61 |
|  | 30 | 60 | 68 | 78 | 53 | 60 | 75 | 57 | 60 | 62 |

As will be seen from Table 7, the vulcanised compositions comprising SBR and the Sample No. 1 or the Sample No. 3 have higher tensile strength, higher modulus and higher tear strength than those comprising the commercial finely divided calcium carbonate and that the former have the elongation and hardness as high as the latter and show much excellent rubbery nature.

*Example 8*

Various amounts of fillers tabulated in Table 5 are incorporated into a synthetic acrylonitrile/butadiene rubber (NBR) by means of 6 x 12″ rolls. The resulting compositions are tested for the extending effect. The test It is apparent that the use of the Samples Nos. 1 and 2 as the extender is advantageous over the use of the commercial calcium carbonates.

*Example 9*

Various amounts of fillers tabulated in Table 5 are incorporated in a synthetic rubber high cis-polybutadiene (Ameripole CB 220) by means of 6 x 12″ rolls. The resulting compositions are tested for the extending effect. The test is carried out on the test strips which have been prepared by press-vulcanising sheets of mixture containing such ingredients as specified in Table 10 below, at 145° C. and under a pressure of 100 kg./cm.² for a given period of time.

TABLE 8

| Ingredients in the mixtures | Sample No. 1 | | | Sample No. 2 | | | Commercial finely divided calcium carbonate (A) | | | Commercial finely divided calcium carbonate (B) | | |
|---|---|---|---|---|---|---|---|---|---|---|---|---|
| Hycar 1042, in parts | 100 | 100 | 100 | 100 | 100 | 100 | 100 | 100 | 100 | 100 | 100 | 100 |
| Filler in parts | 80 | 120 | 160 | 80 | 120 | 160 | 80 | 120 | 160 | 80 | 120 | 160 |
| Zinc oxide in parts | 5 | 5 | 5 | 5 | 5 | 5 | 5 | 5 | 5 | 5 | 5 | 5 |
| Stearic acid in parts | 3 | 3 | 3 | 3 | 3 | 3 | 3 | 3 | 3 | 3 | 3 | 3 |
| Sulfur in parts | 2 | 2 | 2 | 2 | 2 | 2 | 2 | 2 | 2 | 2 | 2 | 2 |
| Accel CZ in parts | 1.5 | 1.5 | 1.5 | 1.5 | 1.5 | 1.5 | | | | | | |
| Accel TMT in parts | 0.1 | 0.1 | 0.1 | 0.1 | 0.1 | 0.1 | | | | | | |
| Nocceler D in parts | | | | | | | 0.5 | 0.5 | 0.5 | 0.5 | 0.5 | 0.5 |
| Nocceler DM in parts | | | | | | | 1.5 | 1.5 | 1.5 | 1.5 | 1.5 | 1.5 |
| DEG in parts | 0.4 | 0.6 | 0.8 | 0.32 | 0.48 | 0.64 | | | | | | |

TABLE 9

| Properties of the vulcanised compositions | Vulcanisation time (min.) | Sample No. 1 | | | Sample No. 2 | | | Commercial finely divided calcium carbonate (A) | | | Commercial finely divided calcium carbonate (B) | | |
|---|---|---|---|---|---|---|---|---|---|---|---|---|---|
| Tensile strength (kg./cm.²) | 20 | 131 | 127 | 137 | 121 | 122 | 124 | 93 | 86 | 75 | 87 | 84 | 73 |
| | 30 | 118 | 120 | 138 | 116 | 117 | 121 | 87 | 78 | 67 | 69 | 73 | 68 |
| 300% Modulus (kg./cm.²) | 20 | 36 | 67 | ------ | 35 | 50 | 90 | 12 | 20 | 23 | 16 | 17 | 22 |
| | 30 | 44 | 76 | ------ | 45 | 55 | 99 | 14 | 19 | 25 | 17 | 18 | 25 |
| Elongation (percent) | 20 | 700 | 600 | 280 | 730 | 610 | 500 | 780 | 720 | 640 | 680 | 750 | 580 |
| | 30 | 600 | 530 | 250 | 590 | 540 | 400 | 670 | 680 | 570 | 600 | 680 | 530 |
| Tear strength (kg./cm.) | 20 | 37 | 47 | 40 | 33 | 38 | 44 | 25 | 30 | 35 | 19 | 22 | 22 |
| | 30 | 36 | 44 | 36 | 30 | 35 | 42 | 25 | 29 | 35 | 19 | 22 | 22 |
| Hardness (JIS) | 20 | 63 | 75 | 85 | 63 | 70 | 84 | 60 | 60 | 70 | 60 | 60 | 67 |
| | 30 | 63 | 76 | 87 | 66 | 74 | 86 | 61 | 62 | 72 | 61 | 61 | 68 | procedure and the vulcanisation conditions are the same as in Example 7.

As will be clear from Table 11, the vulcanised compositions comprising the Samples Nos. 1 and 2 have ten-

TABLE 10

| Ingredients in the mixtures | Sample No. 1 | | | Sample No. 2 | | | Commercial finely divided calcium carbonate (A) | | |
|---|---|---|---|---|---|---|---|---|---|
| Ameripole CB 220, in parts | 100 | 100 | 100 | 100 | 100 | 100 | 100 | 100 | 100 |
| Filler, in parts | 80 | 120 | 160 | 80 | 120 | 160 | 80 | 120 | 160 |
| Zinc oxide, in parts | 5 | 5 | 5 | 5 | 5 | 5 | 5 | 5 | 5 |
| Stearic acid, in parts | 3 | 3 | 3 | 3 | 3 | 3 | 3 | 3 | 3 |
| Sulfur, in parts | 2 | 2 | 2 | 2 | 2 | 2 | 2 | 2 | 2 |
| Nocceler D, in parts | 0.5 | 0.5 | 0.5 | 0.5 | 0.5 | 0.5 | 0.5 | 0.5 | 0.5 |
| Nocceler DM, in parts | 1.5 | 1.5 | 1.5 | 1.5 | 1.5 | 1.5 | 1.5 | 1.5 | 1.5 |
| Acting B, in parts | 0.8 | 1.2 | 1.6 | 0.8 | 1.2 | 1.6 | | | |

TABLE 11

| Properties of the vulcanised compositions | Vulcanisation time (min.) | Sample No. 1 | | | Sample No. 3 | | | Commercial calcium carbonate (B) | | |
|---|---|---|---|---|---|---|---|---|---|---|
| Tensile strength (kg./cm.²) | 15 | 119 | 103 | 95 | 96 | 128 | 107 | 25 | 35 | 39 |
| | 30 | 120 | 96 | 97 | 99 | 120 | 105 | 27 | 34 | 34 |
| 300% Modulus (kg./cm.²) | 15 | 40 | 63 | 82 | 42 | 62 | 75 | 24 | 27 | 31 |
| | 30 | 45 | 65 | 98 | 40 | 66 | 76 | 25 | 29 | 31 |
| Elongation (percent) | 15 | 610 | 460 | 340 | 580 | 580 | 460 | 310 | 10 | 400 |
| | 30 | 590 | 450 | 300 | 600 | 540 | 470 | 340 | 70 | 350 |
| Tear strength (kg./cm.) | 15 | 28 | 37 | 39 | 31 | 26 | 24 | 14 | 18 | 20 |
| | 30 | 32 | 34 | 38 | 33 | 30 | 25 | 15 | 18 | 21 |
| Hardness (JIS) | 15 | 60 | 66 | 72 | 66 | 72 | 79 | 62 | 76 | 70 |
| | 30 | 60 | 68 | 74 | 64 | 74 | 82 | 62 | 77 | 70 |

As will be seen from Table 9, it is clear that the vulcanised compositions comprising the Samples Nos. 1 and 2 have remarkably higher tensile strength, higher modulus and higher tear strength than those comprising the commercial calcium carbonates and that the former have proper degree of elongation and slightly higher hardness than the latter due to the presence of the extender but the former clearly show much excellent rubbery nature.

sile strength and modulus of several times higher than those comprising commercial finely divided calcium carbonate but retain proper degrees of elongation and hardness.

*Example 10*

Various amounts of fillers tabulated in Table 5 are incorporated in a synthetic rubber low cis-polybutadiene (Dien NF-35). The resulting compositions are tested on the extending effect. The test is performed on the test strips which have been prepared press-vulcanising sheets of mixtures comprising such ingredients as specified in Table 12 below, at 141° C. and under a pressure of 200 kg./cm.² for a given period of time.

As will be clear from the above table, the filler according to the present invention, namely Samples Nos. 1 and 3 improve the tear strength of isoprene rubber as much as the commercial finely divided calcium carbonate, and it can impart to isoprene rubber higher tensile strength as well as a proper degree of elongation without involv-

TABLE 12

| Ingredients in the mixtures | Sample No. 1 | | | Sample No. 2 | | | Commercial finely divided calcium carbonate (B) | | |
|---|---|---|---|---|---|---|---|---|---|
| Dien NF-35, in parts | 100 | 100 | 100 | 100 | 100 | 100 | 100 | 100 | 100 |
| Filler, in parts | 60 | 80 | 100 | 60 | 80 | 100 | 60 | 80 | 100 |
| Zinc oxide, in parts | 5 | 5 | 5 | 5 | 5 | 5 | 5 | 5 | 5 |
| Stearic acid, in parts | 3 | 3 | 3 | 3 | 3 | 3 | 3 | 3 | 3 |
| Sulfur, in parts | 2 | 2 | 2 | 2 | 2 | 2 | 2 | 2 | 2 |
| Accel CZ, in parts | 0.6 | 0.6 | 0.6 | 0.6 | 0.6 | 0.6 | 0.6 | 0.6 | 0.6 |
| Sun Circo Sol 2×H (made by Sun-Oil Co.) | 5 | 5 | 5 | 5 | 5 | 5 | 5 | 5 | 5 |

TABLE 13

| Properties of the vulcanised compositions | Vulcanisation time (min.) | Sample No. 1 | | | Sample No. 2 | | | Vulcanisation time (min.) | Commercial finely divided calcium carbonate (B) | | |
|---|---|---|---|---|---|---|---|---|---|---|---|
| Tensile Strength (kg./cm.²) | 45 | 47 | 64 | 77 | 66 | 68 | 71 | 30 | 30 | 34 | 31 |
|  | 60 | 56 | 70 | 87 | 85 | 88 | 90 | 40 | 31 | 35 | 37 |
| 300% Modulus (kg./cm.²) | 45 | 26 | 29 | 65 | 48 | 51 | 58 | 30 | 21 | 20 | 22 |
|  | 60 | 28 | 33 | 68 | 55 | 60 | 70 | 40 | 21 | 22 | 23 |
| Elongation (percent) | 45 | 530 | 450 | 350 | 510 | 480 | 425 | 30 | 800 | 750 | 630 |
|  | 60 | 500 | 450 | 400 | 480 | 450 | 400 | 40 | 750 | 650 | 700 |
| Tear strength (kg./cm.) | 45 | 25 | 31 | 38 | 30 | 38 | 40 | 30 | 19 | 21 | 25 |
|  | 60 | 27 | 33 | 35 | 33 | 42 | 45 | 40 | 20 | 24 | 25 |
| Hardness (JIS) | 45 | 45 | 58 | 75 | 60 | 63 | 73 | 30 | 47 | 52 | 60 |
|  | 60 | 48 | 60 | 75 | 60 | 64 | 77 | 40 | 49 | 53 | 62 |

From Table 13, it is clear that the Samples Nos. 1 and 2 have more excellent reinforcing effect than the commercial finely divided calcium carbonate. With the commercial finely divided calcium carbonate, the optimum time for vulcanisation is said to be 30–40 minutes. Accordingly, the test strips have been vulcanized for the optimum periods of 30 and 40 minutes when the commercial calcium carbonate was used as the filler.

*Example 11*

Various amounts of fillers tabulated in Table 5 are incorporated in an isoprene rubber (IR–305) by means of 6 x 12″ rolls. The resulting compositions are tested for the extending effect. The test is performed on the test strips which have been prepared by press-vulcanizing sheets of mixtures comprising such ingredients as specified in Table 14 below, at 145° C. and under a pressure of 100 kg./cm.² for a given period of time.

ing increase in the hardness. Consequently, the filler of the invention apparently has a reinforcing effect for isoprene rubber, as seen also from Table 11. It may be noted that the Sample No. 3 having a higher content of the vaterite type crystalline calcium carbonate leads to higher improvement in the tensile strength and shows highly reinforcing effect. From this example, it can be confirmed that the new filler according to the present invention shows an excellent and unique reinforcing effect for steric synthetic rubbers.

*Comparative Example 2*

In order to prove that the reinforcing effect of the uniform composition of amorphous silicic acid and the vaterite type crystalline calcium carbonate according to the present invention is superior to that of such a simple mixture in which fine particles of amorphous silicic acid are merely admixed with finely divided calcium carbonate

TABLE 14

| Ingredients in the mixture | Sample No. 1 | | | | Sample No. 2 | | | | Commercial finely divided calcium carbonate (B) | | | |
|---|---|---|---|---|---|---|---|---|---|---|---|---|
| IR-305, in parts | 100 | 100 | 100 | 100 | 100 | 100 | 100 | 100 | 100 | 100 | 100 | 100 |
| Filler, in parts | 80 | 100 | 120 | 160 | 80 | 100 | 120 | 160 | 80 | 100 | 120 | 160 |
| Zinc oxide, in parts | 5 | 5 | 5 | 5 | 5 | 5 | 5 | 5 | 5 | 5 | 5 | 5 |
| Stearic acid, in parts | 3 | 3 | 3 | 3 | 3 | 3 | 3 | 3 | 3 | 3 | 3 | 3 |
| Sulfur, in parts | 2.5 | 2.5 | 2.5 | 2.5 | 2.5 | 2.5 | 2.5 | 2.5 | 2.5 | 2.5 | 2.5 | 2.5 |
| Accel CZ, in parts | 1.5 | 1.5 | 1.5 | 1.5 | 1.5 | 1.5 | 1.5 | 1.5 | 1.5 | 1.5 | 1.5 | 1.5 |

TABLE 15

| Properties of the vulcanised compositions | Vulcanisation time (min.) | Sample No. 1 | | | | Sample No. 3 | | | | Commercial finely divided calcium carbonate (B) | | | |
|---|---|---|---|---|---|---|---|---|---|---|---|---|---|
| Tensile strength (kg./cm.²) | 20 | 112 | 99 | 100 | 96 | 130 | 127 | 121 | 107 | 73 | 73 | 71 | 62 |
|  | 30 | 122 | 104 | 101 | 96 | 125 | 114 | 120 | 102 | 61 | 70 | 73 | 61 |
| 300% Modulus (kg./cm.²) | 20 | 24 | 30 | 36 | 49 | 25 | 25 | 27 | 35 | 31 | 31 | 30 | 26 |
|  | 30 | 25 | 29 | 32 | 48 | 24 | 23 | 27 | 34 | 28 | 29 | 28 | 26 |
| Elongation (percent) | 20 | 750 | 700 | 650 | 580 | 800 | 800 | 800 | 750 | 550 | 500 | 530 | 550 |
|  | 30 | 800 | 780 | 700 | 600 | 800 | 800 | 800 | 780 | 500 | 500 | 530 | 580 |
| Tear strength (kg./cm.) | 20 | 26 | 24 | 25 | 32 | 28 | 25 | 27 | 45 | 29 | 26 | 26 | 24 |
|  | 30 | 26 | 25 | 26 | 31 | 26 | 24 | 26 | 36 | 29 | 24 | 24 | 24 |
| Hardness (JIS) | 20 | 52 | 60 | 65 | 80 | 52 | 56 | 63 | 75 | 56 | 59 | 62 | 62 |
|  | 30 | 52 | 61 | 65 | 81 | 52 | 57 | 63 | 76 | 56 | 59 | 62 | 62 | and therefore the former exist outside the grains of the latter, the following test is performed. In the test, finely divided crystalline calcium carbonate of the vaterite type and of a grain size range of 0.3–0.5 micron is firstly prepared and 1 kg. of this product is dispersed in 10 l. of water. The resulting dispersion is then added with 957 grams of such a sodium silicate in which the $SiO_2$ content is 32.7% and the $SiO_2/Na_2O$ molar ratio 2.52. Carbon dioxide gas is then blown into the admixture while kept at a temperature of not higher than 10° C. Amorphous silicic acid is deposited around and on the grains of the calcium carbonate. This mixture comprising silicic acid and calcium carbonate is filtered off by Buchner funnel, washed with water and dried. This product is hereinafter called "Sample No. X." Further, 1 kg. of the same grade of crystalline calcium carbonate of the vaterite type is dispersed in 10 l. of water and the dispersion is admixed with 315 grams of colloidal silicic acid under agitation to form a completely uniform mixture which is subsequently dehydrated by filtration and dried. The resultant product is hereinafter called "Sample No. Y." Electron microscopic observation of these Samples Nos. X and Y show that these are mixtures of silicic acid and the vaterite type crystalline calcium carbonate (the proportion of silicic acid to calcium carbonate is 1:2.35 by weight). These samples, Nos. X and Y, as well as the aforesaid Samples Nos. 1 and 2, are incorporated into three kinds of synthetic rubber, that is, NBR, high cis-polybutadiene and low cis-polybutadiene in such proportions as specified in Table 16 below, and the resulting compositions are tested. The results are shown in Table 17 below. It may be seen that the reinforcing effect of the Samples Nos. X and Y is inferior to that of the Samples Nos. 1 and 2.

What we claim is:
1. A process for preparing calcium carbonate crystals selected from the group consisting of the vaterite type, aragonite type and mixtures thereof, having dispersed therein amorphous silicic acid, which comprises the steps of:
   (a) treating a mixture of an aqueous suspension of colloidal silicic acid and a solution of calcium chloride with ammonium hydroxide so that the pH is at least 8;
   (b) treating said mixture of increased alkalinity with a carbonating reagent selected from the group consisting of gaseous carbon dioxide and ammonium carbonate; and
   (c) maintaining the pH of the carbonated mixture at a value of at least 8 by the addition of further ammonium hydroxide thereto.
2. A process according to claim 1, in which said carbonating reagent is gaseous carbon dioxide and wherein said carbon dioxide is diluted with an inert gas.
3. A process according to claim 1, in which said mixture of increased alkalinity is carbonated at a temperature below 20° C. and the vaterite type of crystal is formed.
4. A process according to claim 1, in which said mixture of increased alkalinity is carbonated at a temperature above 40° C. and the aragonite type of crystal is formed.
5. A composition of matter as set forth in claim 1.
6. A composition of matter comprising: a mixture of synthetic rubber selected from the group consisting of styrene/butadiene, acrylonitrile/butadiene, cis-butadiene and isoprene and a filler consisting of the composition of matter of claim 1, said filler being present in an amount of from 60 to 120 parts by weight per 100 parts of said rubber.

TABLE 16

| | Kinds of synthetic rubbers | | | | | | | | | | | |
|---|---|---|---|---|---|---|---|---|---|---|---|---|
| | NBR (Hycar 1042) | | | | High cis-polybutadiene (Ameripole CB 220) | | | | Low cis-polybutadiene (NF-35) | | | |
| Sample | No. 1 | No. 2 | No. X | No. Y | No. 1 | No. 2 | No. X | No. Y | No. 1 | No. 2 | No. X | No. Y |
| Ingredients in the mixture: | | | | | | | | | | | | |
| Synthetic rubber, in parts | 100 | 100 | 100 | 100 | 100 | 100 | 100 | 100 | 100 | 100 | 100 | 100 |
| Filler, in parts | 100 | 100 | 100 | 100 | 50 | 50 | 50 | 50 | 100 | 100 | 100 | 100 |
| Zinc oxide, in parts | 5 | 5 | 5 | 5 | 5 | 5 | 5 | 5 | 3 | 3 | 3 | 3 |
| Stearic acid, in parts | 1.5 | 1.5 | 1.5 | 1.5 | 1.5 | 1.5 | 1.5 | 1.5 | | | | |
| Sulfur, in parts | 2 | 2 | 2 | 2 | 2 | 2 | 2 | 2 | 2 | 2 | 2 | 2 |
| Accel CZ, in parts | 1.5 | 1.5 | 1.5 | 1.5 | 1 | 1 | 1 | 1 | 0.6 | 0.6 | 0.6 | 0.6 |
| Sun Circo Sol 2xH | | | | | | | | | 5 | 5 | 5 | 5 |
| Vulcanisation conditions | Press-vulcanised at 145° C. under 200 kg./cm.² | | | | Press-vulcanised at 141° C. under 200 kg./cm.² | | | | Press-vulcanised at 141° C. under 200 kg./cm.² | | | |

TABLE 17

| Properties of the vulcanised compositions | NBR | | | | | High cis-polybutadiene | | | | | Low cis-polybutadiene | | | | |
|---|---|---|---|---|---|---|---|---|---|---|---|---|---|---|---|
| | Vulcanisation time (min.) | Sample No. | | | | Vulcanisation time (min.) | Sample No. | | | | Vulcanisation time (min.) | Sample No. | | | |
| | | 1 | 2 | X | Y | | 1 | 2 | X | Y | | 1 | 2 | X | Y |
| Tensile strength (kg./cm.²) | 20 | 138 | 128 | 86 | 102 | 30 | 78 | 52 | 42 | 47 | 50 | 87 | 76 | 50 | 60 |
| | 30 | 132 | 126 | 84 | 104 | 40 | 78 | 59 | 40 | 52 | 60 | 85 | 80 | 53 | 68 |
| 300% Modulus (kg./cm.²) | 20 | 36 | 38 | 58 | 37 | 30 | 25 | 24 | 20 | 19 | 50 | 68 | 60 | ------ | 53 |
| | 30 | 44 | 45 | 72 | 43 | 40 | 24 | 24 | 20 | 18 | 60 | 69 | 61 | ------ | 57 |
| Elongation (percent) | 20 | 750 | 700 | 500 | 800 | 30 | 830 | 750 | 730 | 780 | 50 | 400 | 400 | 230 | 350 |
| | 30 | 600 | 630 | 480 | 680 | 40 | 630 | 700 | 750 | 800 | 60 | 480 | 400 | 200 | 330 |
| Hardness (JIS) | 20 | 75 | 74 | 75 | 72 | 30 | 45 | 48 | 45 | 49 | 50 | 75 | 77 | 76 | 73 |
| | 30 | 77 | 78 | 78 | 75 | 40 | 46 | 48 | 47 | 50 | 60 | 75 | 77 | 76 | 76 |

As to the vulcanisation additives used in Examples 7–11 and Comparative Example 2, the following abbreviations are employed:

TMT: Tetramethyl-thiuram disulphide
CZ: n-Cyclohexyl-benzothiazole disulfinamide
CHA: Cyclohexylamine
DEG: Diethylene glycol Nocceler D and Nocceler DM are trade names of diphenyl guanidine and dibenzothiazyl sulphide, respectively.

References Cited

UNITED STATES PATENTS

| 2,964,382 | 12/1960 | Hall | 23—66 |
| 3,133,824 | 5/1964 | Podschus | 106—306 |
| 3,179,493 | 4/1965 | Diekmann | 23—66 |

JULIUS FROME, *Primary Examiner.*

MORRIS LIEBMAN, *Examiner.*

S. L. FOX, *Assistant Examiner.*